United States Patent
Lai

(10) Patent No.: US 10,150,193 B2
(45) Date of Patent: Dec. 11, 2018

(54) HIGH-PRESSURE CUTTING FLUID APPARATUS OF TURRET HEAD OF MACHINE TOOL

(71) Applicant: Chien Fu Lai, Taichung (TW)

(72) Inventor: Chien Fu Lai, Taichung (TW)

(73) Assignee: Jongherya Co., Ltd., Taichung (TW)

( * ) Notice: Subject to any disclaimer, the term of this patent is extended or adjusted under 35 U.S.C. 154(b) by 139 days.

(21) Appl. No.: 15/436,842

(22) Filed: Feb. 19, 2017

(65) Prior Publication Data

US 2017/0157728 A1 Jun. 8, 2017

(30) Foreign Application Priority Data

May 20, 2016 (TW) .............................. 105115680 A

(51) Int. Cl.
| | |
|---|---|
| B23Q 11/10 | (2006.01) |
| B23Q 16/10 | (2006.01) |
| B23Q 1/00 | (2006.01) |
| B23B 29/24 | (2006.01) |

(52) U.S. Cl.
CPC ............ *B23Q 11/10* (2013.01); *B23Q 1/0027* (2013.01); *B23B 29/24* (2013.01); *B23Q 2220/002* (2013.01)

(58) Field of Classification Search
CPC .... B23Q 11/10; B23Q 2220/002; B23B 29/24
See application file for complete search history.

(56) References Cited

U.S. PATENT DOCUMENTS

| | | | | |
|---|---|---|---|---|
| 3,798,721 A | * | 3/1974 | Schalles .................. | B23B 29/24 29/42 |
| 4,643,056 A | * | 2/1987 | Arehart ................. | B23B 29/242 407/11 |
| 4,706,351 A | * | 11/1987 | Chuang ................... | B23B 3/164 29/35.5 |
| 5,265,505 A | * | 11/1993 | Frechette ............. | B23Q 1/0018 29/39 |
| 8,677,584 B2 | * | 3/2014 | Aoyagi ................. | B23B 29/242 29/39 |
| 9,393,660 B2 | * | 7/2016 | Meidar .............. | B23Q 11/1053 |
| 2005/0229371 A1 | * | 10/2005 | Lu .......................... | B23B 29/323 29/39 |

OTHER PUBLICATIONS

Translation TW466751.*

* cited by examiner

*Primary Examiner* — Sara Addisu

(57) ABSTRACT

A high-pressure cutting fluid guide apparatus of a turret head of a machine tool is provided. When a high-pressure cutting fluid is input to a cutting liquid passage, the high-pressure cutting fluid flows along a through hole of a water guide cylinder, and passes through a main perforation of a partition, and then flows to a water outlet of a sealing ring to be guided into a water inlet of a cutting disc. A secondary perforation of the partition guides the high-pressure cutting fluid in the through hole to a press surface portion of the sealing ring. The sealing ring is located in an annular trough, and the press surface portion is pushed by the high-pressure cutting fluid pressure to generate the energy of the axial displacement.

10 Claims, 16 Drawing Sheets

HIGH-PRESSURE CUTTING FLUID APPARATUS OF TURRET HEAD OF MACHINE TOOL

FIELD OF THE INVENTION

The present invention relates to a high-pressure cutting fluid guide apparatus used for a water inlet of a cutting disc, and more particularly to a high-pressure cutting fluid guide apparatus of a turret head of a machine tool to prevent a high-pressure cutting fluid from leakage and to prolong the service life of a sealing ring.

BACKGROUND OF THE INVENTION

With the rapid development of machine tool technology and material science and technology, more new equipment and new materials are used in modern manufacturing industry. A new material is a big challenge to the cutter technology. In the increasingly competitive modern manufacturing industry, all enterprises want to improve competitiveness and production efficiency. However, with the extensive use of carbide cutting tools and more methods to improve production efficiency, the key point to improve the cutting parameters is to control heat. The cutting heat affects the formation and emission of chips. If a cutting fluid is poured to a cutting area having a temperature up to 1000° C. according to the traditional way, the cutting fluid will be evaporated immediately to form a high-pressure steam zone. This will block the flow of a low pressure coolant, so the coolant cannot reach the cutting edge. In order to solve this problem, people have developed a high-pressure cutting fluid system for modern machine tools. For example, a high-pressure cutting fluid from a high-pressure pump is guided to the turret head and sprayed to a cutting area between chips and the front of a blade through a small nozzle. It can effectively reduce the cutting heat of the cutting area, prolong the service life of the cutter, and increase chip fragility to be broken easily so as to obtain short chips without the cleaning problems because the machine tool shuts down due to long chips.

As shown in FIGS. 1, 2, 3, and 4, a conventional cutting fluid guide apparatus of a turret head of a machine tool comprises a fixing seat 11, a spring 12, a water guide member 13, and a sealing ring 14. The fixing seat 11 is fixed on a casing 21 of a turret head 20. The fixing seat 11 has a through hole 110. One end of the through hole 110 is a fluid inlet 111 for inputting a cutting fluid. The other end of the through hole 110 has a mounting hole 112 which is disposed concentrically relative to the transposition locus trajectory of a plurality of water inlets 220 of a cutting disc 22 of the turret head 20. The spring 12 is mounted at the innermost end of the mounting hole 112. The water guide member 13 is a cylinder. One end of the water guide member 13 is mounted in the mounting hole 112 and biased by the spring 12, and the other end extends out of the mounting hole 112. The front portion of the water guide member 13 has a fixing trough 130 therein. The surface of the water guide member 13 mounted in the mounting hole 112 is provided with an O-shaped anti-leakage ring 131 in contact with the wall of the mounting hole 112 to form a leak-proof. The center of the water guide member 13 is formed with a fluid passage 132 communicating with the through hole 110. The sealing ring 14 is an elastic plastic ring disposed in the fixing trough 130. One end of the sealing ring 14 has a sealing surface 140. The center of the sealing ring 14 is formed with a water guide hole 141 corresponding to the fluid passage 132. As shown in FIG. 3 and FIG. 5, when the cutting fluid enters the through hole 110 of the fixing seat 11, the sealing ring 14 of the water guide member 13 is biased by the spring 13 to get contact with the cutting disc 22 of the turret head 20, such that the sealing surface 140 of the sealing ring 14 is tightly attached to the circumferential surface of the water inlet 220 of the cutting disc 22 to provide a sealing effect, and the cutting fluid passes through the fluid passage 132 of the water guide member 13 and the water guide hole 141 of the sealing ring 14 and flows to the water inlet 220 of the cutting disc 22 for use. On the contrary, when the cutting disc 22 is controlled to rotate by a power unit (not shown) provided on the casing 21 of the turret head 20 for changing a cutter, the cutting fluid from the water guide member 13 can be exchangeably received by the other water inlet 220, and the cutting disc 22 continues to feed the cutting fluid from the water inlet 220 to the cutting zone of the tool.

Although the conventional cutting fluid guide apparatus can be used to guide the cutting fluid into the water inlet 220 of the cutting disc 22, the cutting fluid is only used under the low pressure condition (working condition). If the conventional cutting fluid guide apparatus is used to a high-pressure cutting fluid system (Note: The normal standard of the high-pressure cutting fluid system is that the nozzle is $\Phi 1$ mm orifice and the cutting fluid pressure must be greater than 70 bar.), as shown in FIG. 6, the sealing ring 14 will be unable to bear the high-pressure cutting fluid pressure. The high-pressure cutting fluid is leaking from the gap between the circumferential surface of the water inlet 220 and the sealing surface 140 of the sealing ring 14. Constant friction between the sealing surface 140 of the sealing ring 14 and the cutting disc 22 wore out the sealing surface 140 of the sealing ring 14, so it is unable to provide a good sealing effect for a long time. For a high-pressure cutting fluid system, it will inevitably cause maintenance difficulties or problems. Accordingly, the inventor of the present invention has devoted himself based on his many years of practical experiences to solve these problems.

SUMMARY OF THE INVENTION

The primary object of the present invention is to provide a high-pressure cutting fluid guide apparatus of a turret head of a machine tool. A casing of the turret head has a cutting fluid passage therein. An output end of the cutting fluid passage has a mounting hole relative to a transposition locus trajectory of a plurality of water inlets of a cutting disc of the turret head. The mounting hole is provided with a water guide unit. The water guide unit includes a water guide cylinder and a sealing ring. The water guide cylinder has a cylinder body mounted in the mounting hole and a drain head portion extending out of the mounting hole. The cylinder body has a through hole therein. The through hole is in communication with the cutting liquid passage. The drain head portion has an annular trough therein and a partition between the annular trough and the through hole. The partition has a main perforation at a central portion thereof and at least one secondary perforation around the main perforation. The annular trough and the through hole are communicated with each other through the main perforation and the secondary perforation. The sealing ring is a resilient wear-resistant plastic ring corresponding in shape to the annular trough and movable axially to be mounted in the annular trough. An outer end of the sealing ring has a sealing surface. The center of the sealing ring has a water outlet corresponding in size to the main perforation. An outer circumference of the water outlet is formed with a press surface portion corresponding to the secondary perforation. When the high-pressure cutting fluid is input to the cutting liquid passage, the high-pressure cutting fluid flows along the through hole of the water guide cylinder, and passes through the main perforation of the partition, and then flows to the water outlet of the sealing ring to be guided into the water inlet of the cutting disc. The secondary perforation of the partition guides the high-pressure cutting fluid in the through hole to the press surface portion of the sealing ring. The sealing ring is located in the annular trough, and the press surface portion is pushed by the high-pressure cutting fluid pressure to generate the energy of the axial displacement. The sealing surface of the sealing ring can be tightly adhered to the circumferential surface of the water inlet of the cutting disc so as to seal and block the high-pressure cutting fluid from leaking via the water inlet of the cutting disc. The friction caused by the sealing surface of the sealing ring to get contact with the rotary cutting disc can be automatically compensated by the wear caused by the axial displacement of the sealing ring in the annular trough so as to prolong the service life of the sealing ring.

Preferably, the through hole of the water guide cylinder is in a trumpet shape and has an enlarged portion extending to the secondary perforation of the partition. The press surface portion of the sealing ring can obtain the liquid pressure or thrust of the high-pressure cutting fluid directly from the enlarged portion of the through hole by means of the secondary perforation of the partition, so that the sealing ring generates a thrust energy of the outward axial displacement in the annular trough.

Preferably, the press surface portion of the sealing ring is formed with a press groove having a V-shaped cross-section. Through the press groove, the area of thrust surface in increased. In addition to improving the sealing effect that the sealing surface of the sealing ring is tightly attached to the circumferential surface of the water inlet of the cutting disc, the shape of the press groove will be deformed and enlarged with the incoming liquid pressure. The greater the deformation, the greater the energy. The sealing ring provides a better sealing effect for the annular trough during the passing of the high-pressure cutting fluid. The press groove is provided with a spring member for restraining indentation of the press groove, so that the push groove can be maintained or held in the V shape for a long time.

Preferably, one end of the main perforation of the partition is formed with an engaging portion corresponding to an annular inner hole of the sealing ring. The annular inner hole of the sealing ring is engaged with the engaging portion. The engaging portion provides a support and displacement guide function for the annular inner hole of the sealing ring. When the press surface portion of the sealing ring bears the fluid pressure or the thrust, the press energy can be guided to the sealing surface portion in a stable manner.

Preferably, the water outlet of the sealing ring is a tapered water outlet having a reduced diameter from the inside to the outside. When the high-pressure cutting fluid is drained from the water outlet to the water inlet of the cutting disc, the tapered wall of the water outlet is able to bear the thrust of the high-pressure cutting fluid so that the sealing surface of the sealing ring is to seal the water inlet of the cutting disc tightly, enhancing the sealing effect.

Preferably, the surface of the cylinder body of the water guide cylinder is formed with at least an annular groove. The annular groove is provided with an O-shaped ring and an annular spring clip. When the cylinder body is mounted in the mounting hole, the O-shaped ring is in contact with the wall of the mounting hole to prevent leakage, and the expansion in the radial direction of the spring clip acts on the wall of the mounting hole to provide a positioning effect, so that the water guide cylinder can be easily assembled or disassembled in the mounting hole.

Preferably, the cutting fluid passage of the casing of the turret head is connected with a pump through a water supply pipe. The water supply pipe is provided with a water control valve. One end of the water control valve is a pressure-relief drain end communicating with a water source. Through the water control valve, the water supply pipe communicates with the pump. The cutting fluid passage is inputted with the high-pressure cutting fluid from the pump. The switching of the water control valve enables the high-pressure cutting fluid in the cutting fluid passage and the water supply pipe to be drained to the water source via the pressure-relief drain end. The high-pressure thrust release action of the press surface portion of the sealing ring allows the sealing ring to be moved inward and axially in the annular trough, such that the contact between the sealing surface of the sealing ring and the cutting disc can reduce or avoid wear and tear during the rotation of the cutting disc for changing a cutter.

Preferably, the water inlet of the cutting disc of the turret head is provided with an inlet mating member. An outer end of the inlet mating member has a mating through hole corresponding in size to the water outlet of the sealing ring and communicating with the water inlet. The existing cutting disc on the market has a plurality of water inlets of different diameters. Through the inlet mating member, the cutting disc can be mated with the sealing ring well to achieve the desired effect. A valve hole is formed inside the mating through hole of the inlet mating member. An outer end of the valve hole is provided with a support plate. The support plate has a plurality of apertures to communicate with the valve hole and the water inlet. A compression spring is supported by the support plate for pushing a steel ball to close an inner end of the mating through hole. When the liquid pressure of the high-pressure cutting fluid inside the water guide unit is greater than the liquid pressure of the high-pressure cutting fluid at the water inlet, the steel ball is pushed to open the mating through hole so that the high-pressure cutting fluid passes through the valve hole to enter the water inlet. On the contrary, when the input of the high-pressure cutting fluid is stopped, the steel ball is returned to close the mating through hole by the rebound force of the compression spring to prevent the high-pressure cutting fluid in the water inlet from flowing back to the water guide unit. When the cutting disc is rotated for changing a cutter, the high-pressure cutting fluid won't be ejected from the water inlet.

DETAILED DESCRIPTION OF THE PREFERRED EMBODIMENTS

Embodiments of the present invention will now be described, by way of example only, with reference to the accompanying drawings.

Figure 1:
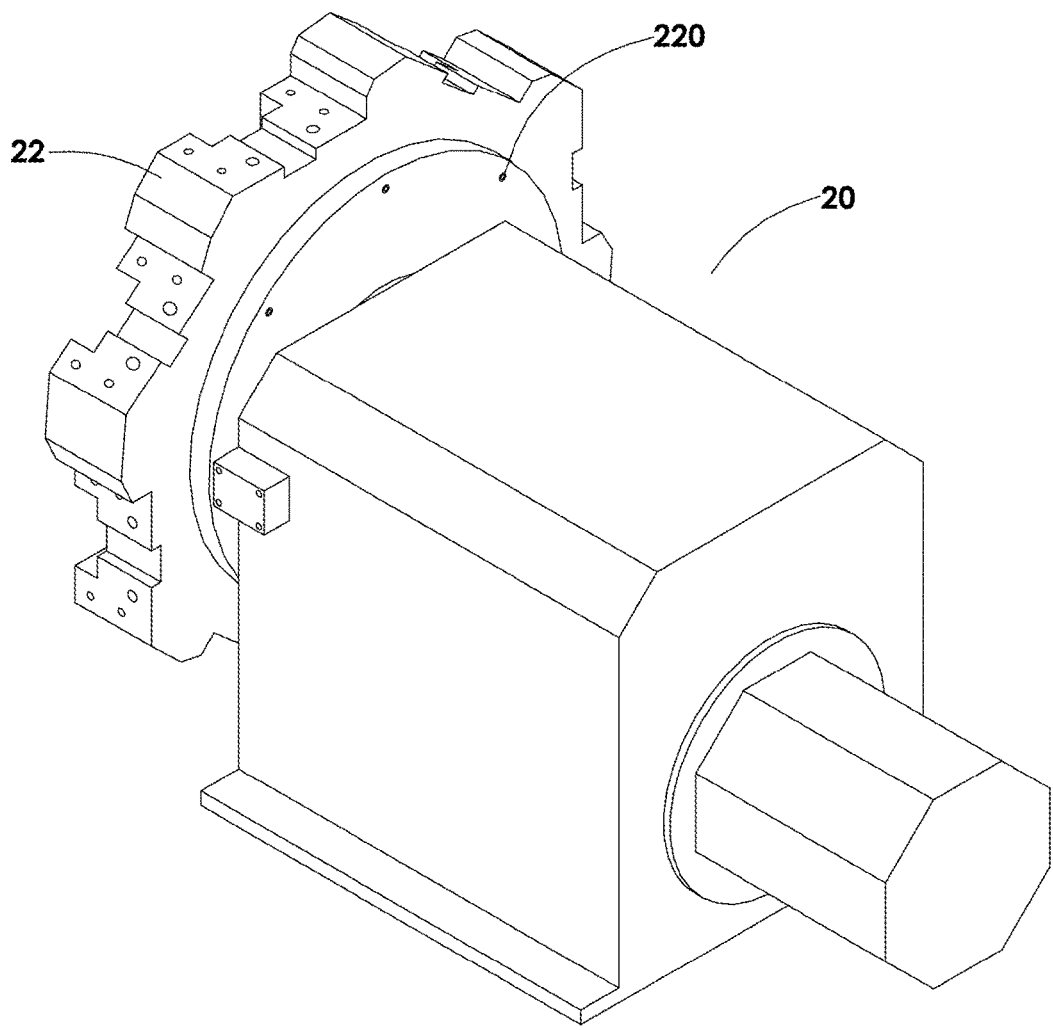
FIG. 1 is a perspective view of a conventional cutting fluid guide apparatus used to a turret head.
Figure 2:
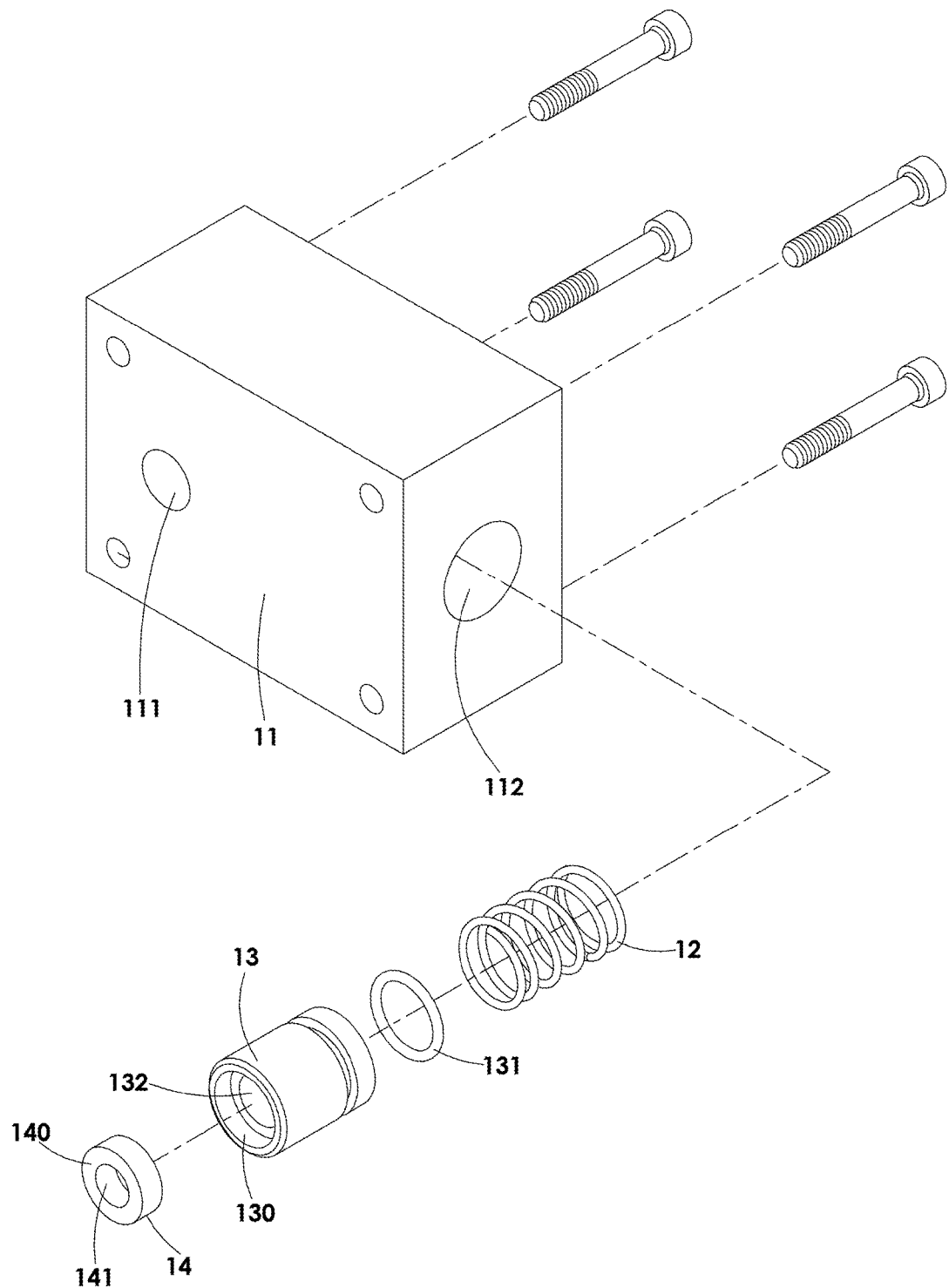
FIG. 2 is an exploded view of the conventional cutting fluid guide apparatus.
Figure 3:
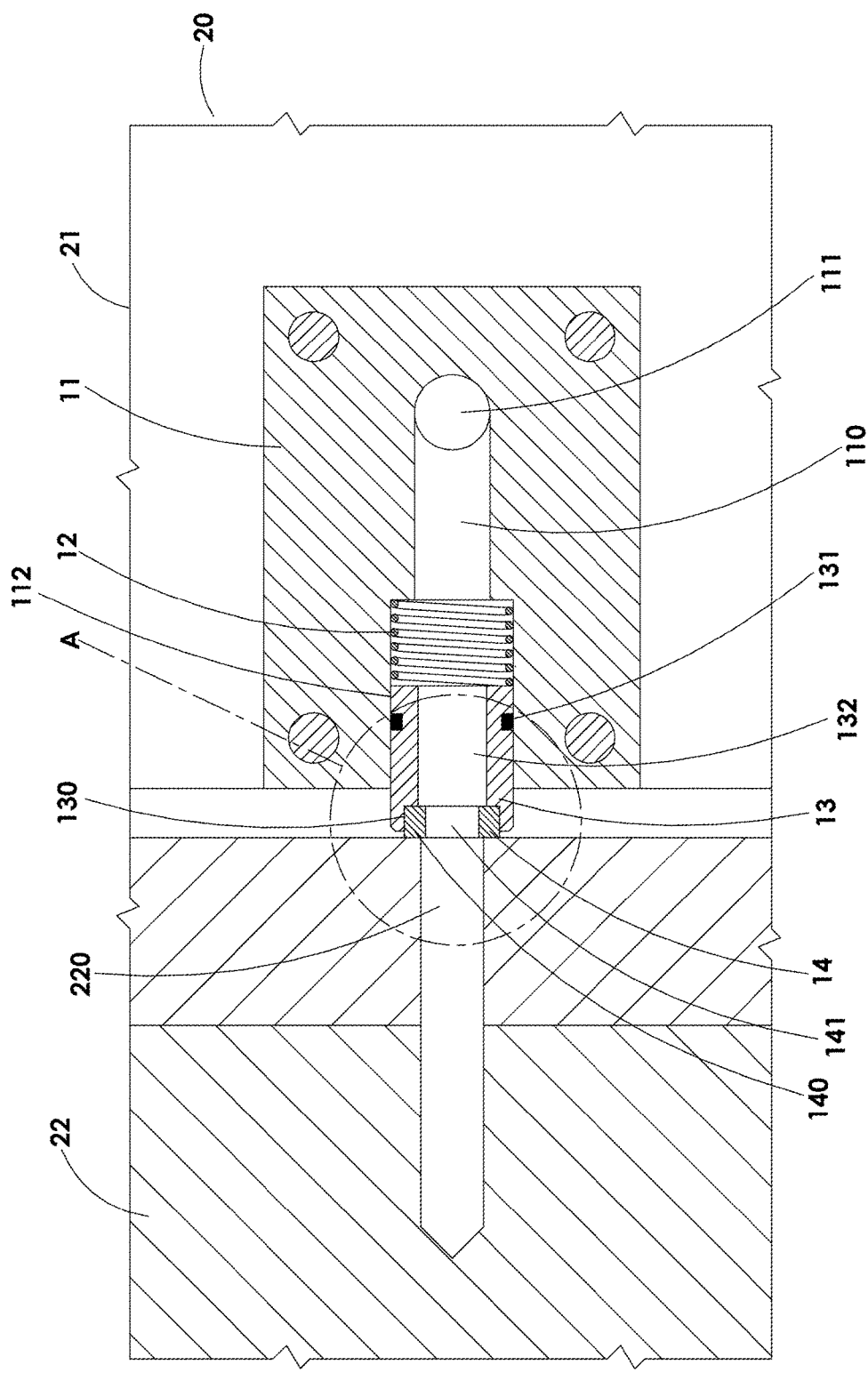
FIG. 3 is a sectional view of the conventional cutting fluid guide apparatus.
Figure 4:
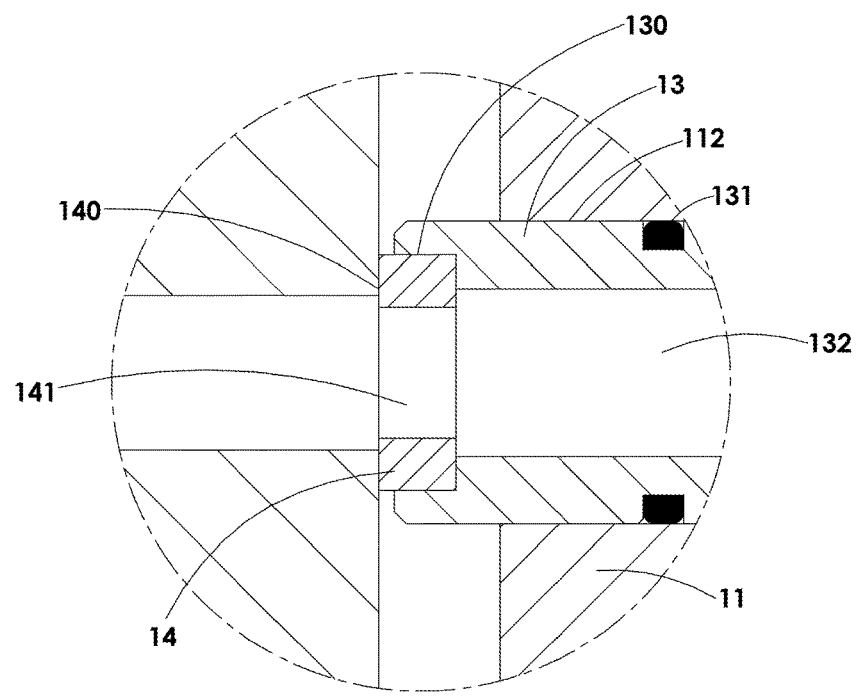
FIG. 4 is an enlarged view of the circle A of FIG. 3.
Figure 5:
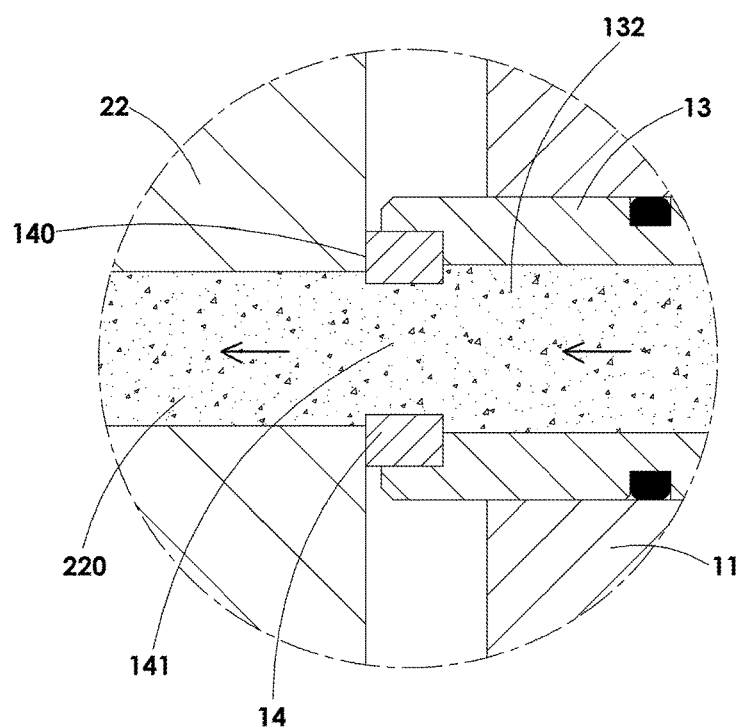
FIG. 5 is a schematic view of the conventional cutting fluid guide apparatus when in use.
Figure 6:
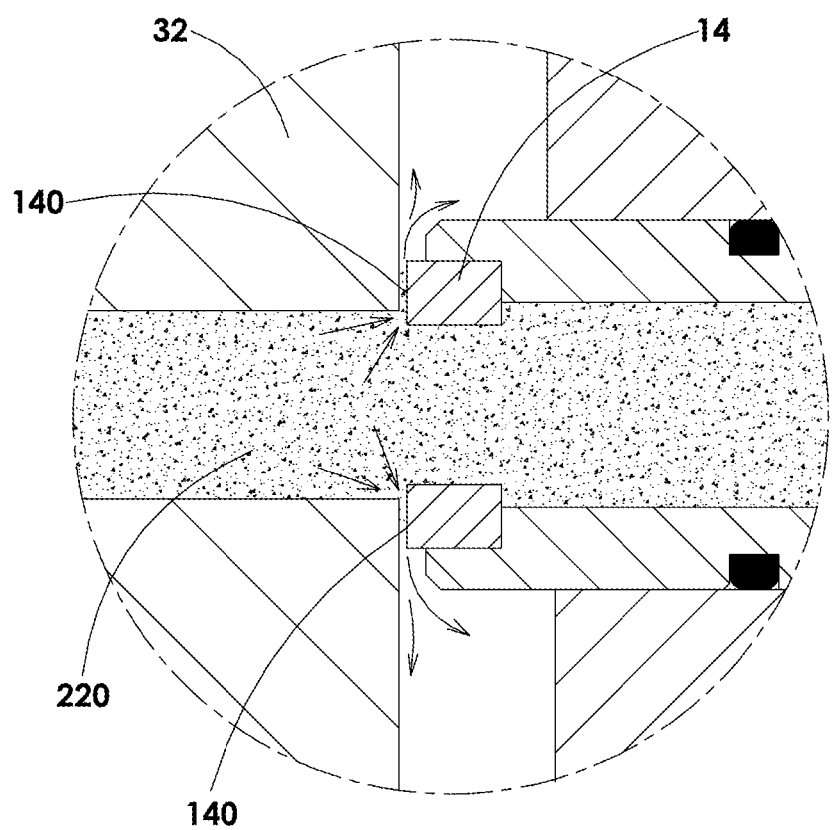
FIG. 6 is a schematic view of the conventional cutting fluid guide apparatus, showing that the high-pressure cutting fluid is leaking.
Figure 7:
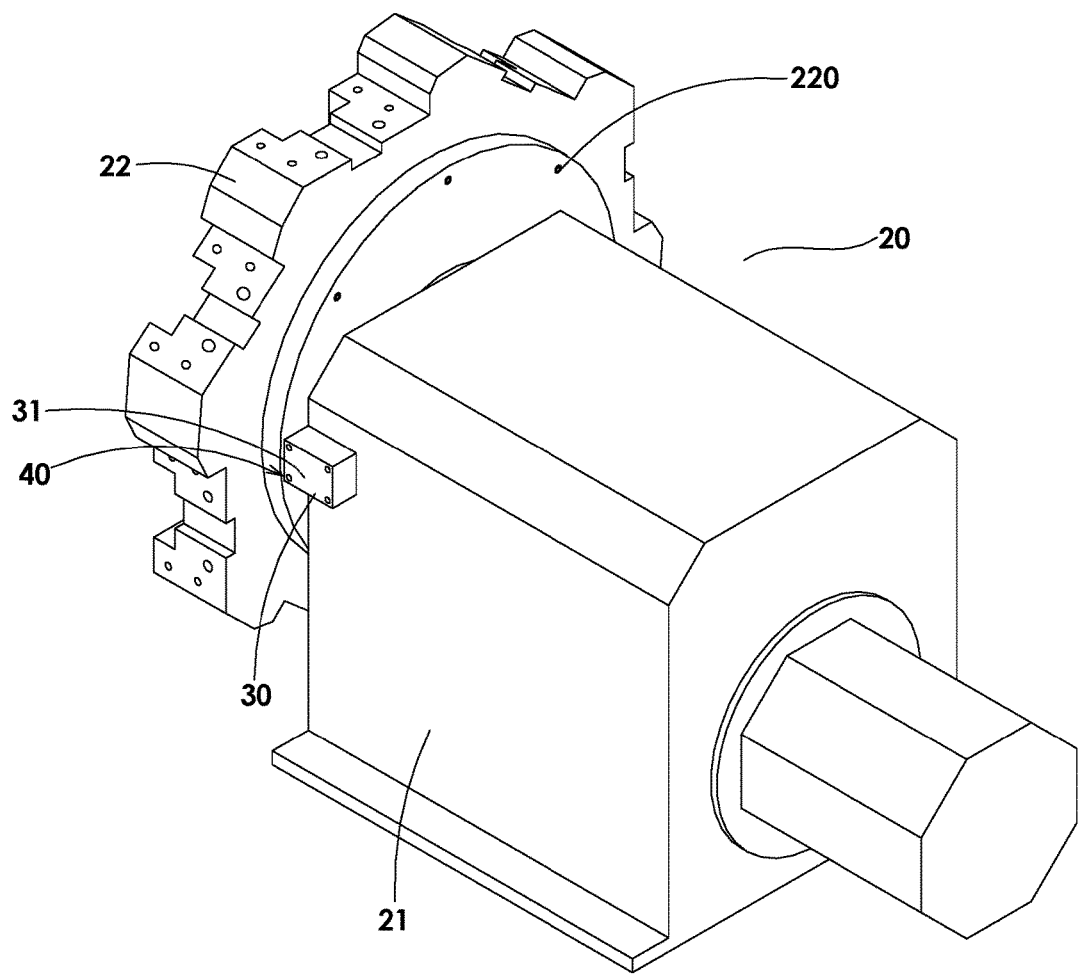
FIG. 7 is a perspective view of a water guide unit applied to a turret head of the present invention.
Figure 8:
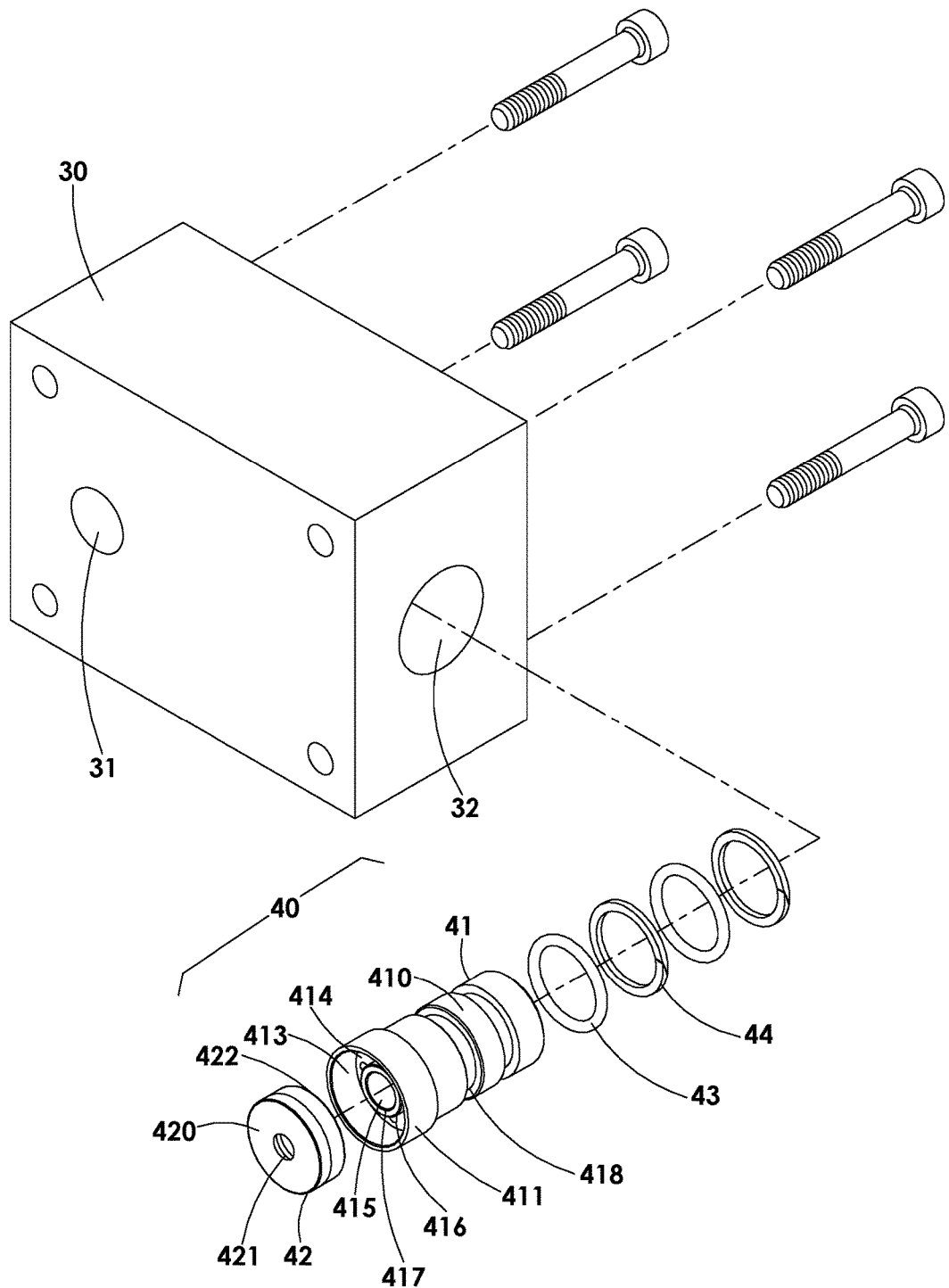
FIG. 8 is an exploded view of the water guide unit of the present invention.
Figure 9:
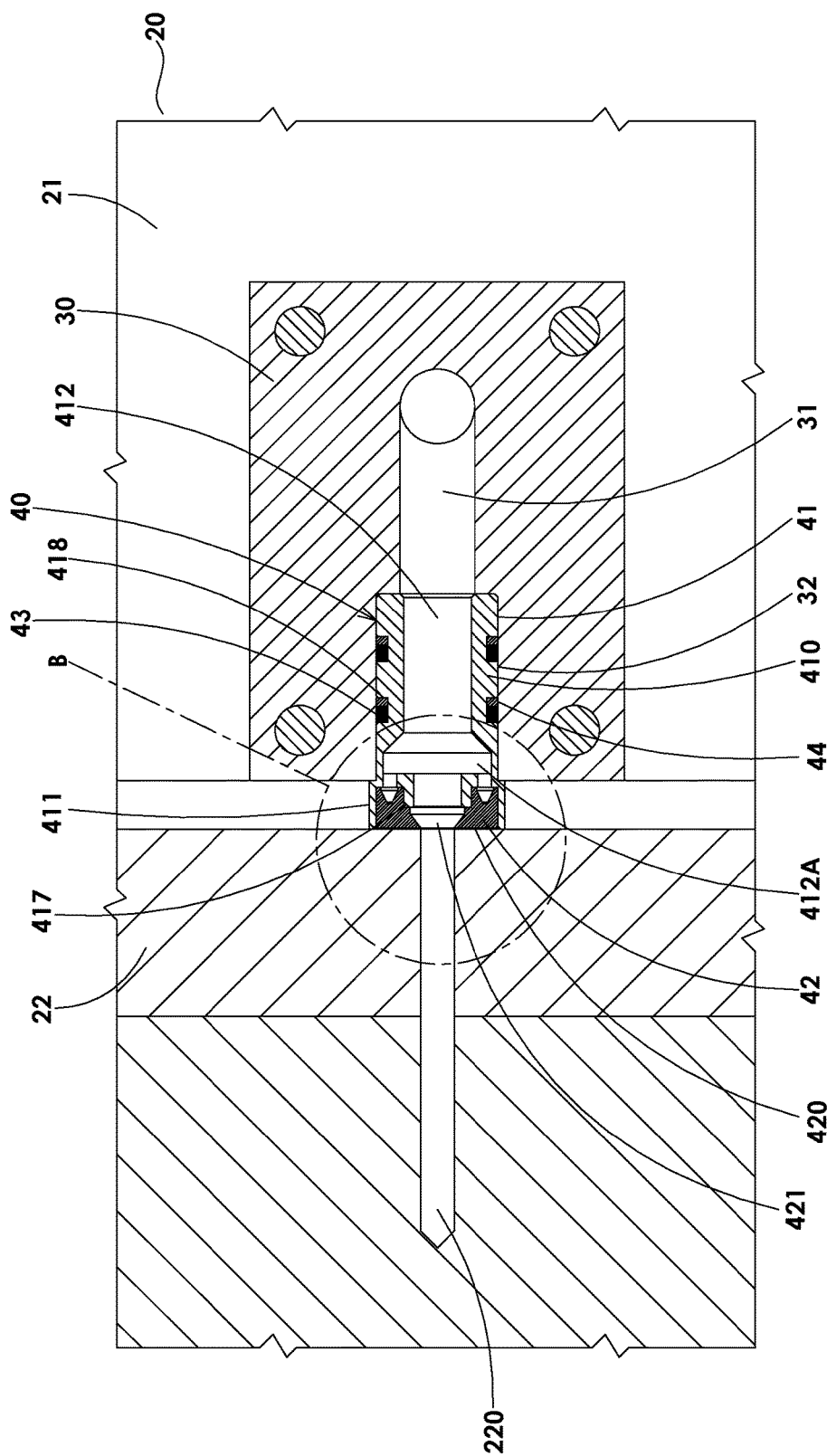
FIG. 9 is a sectional view of the water guide unit of the present invention.
Figure 10:
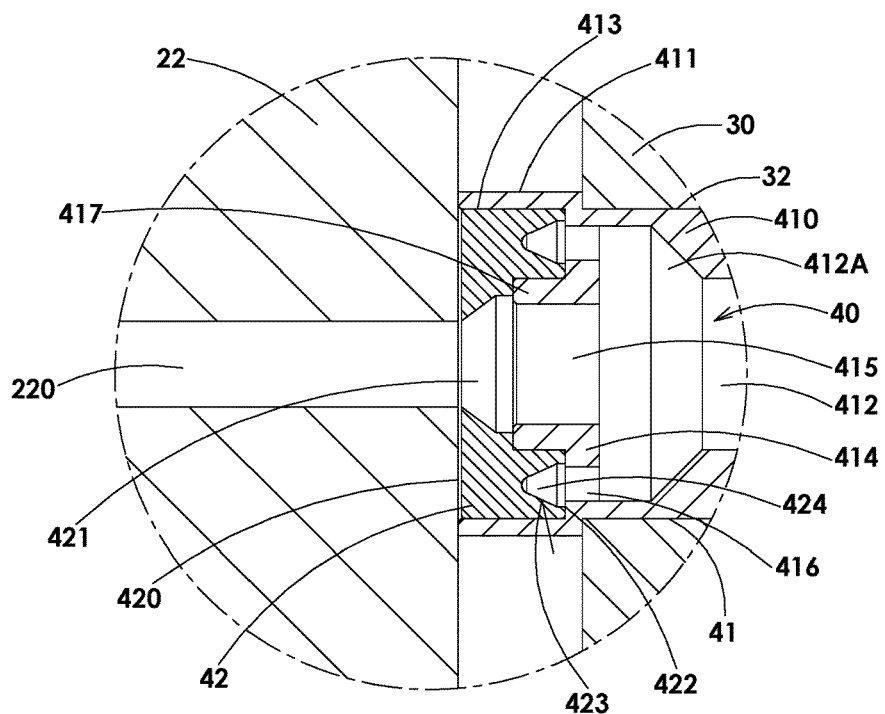
FIG. 10 is an enlarged view of the circle B of FIG. 9.
Figure 11:
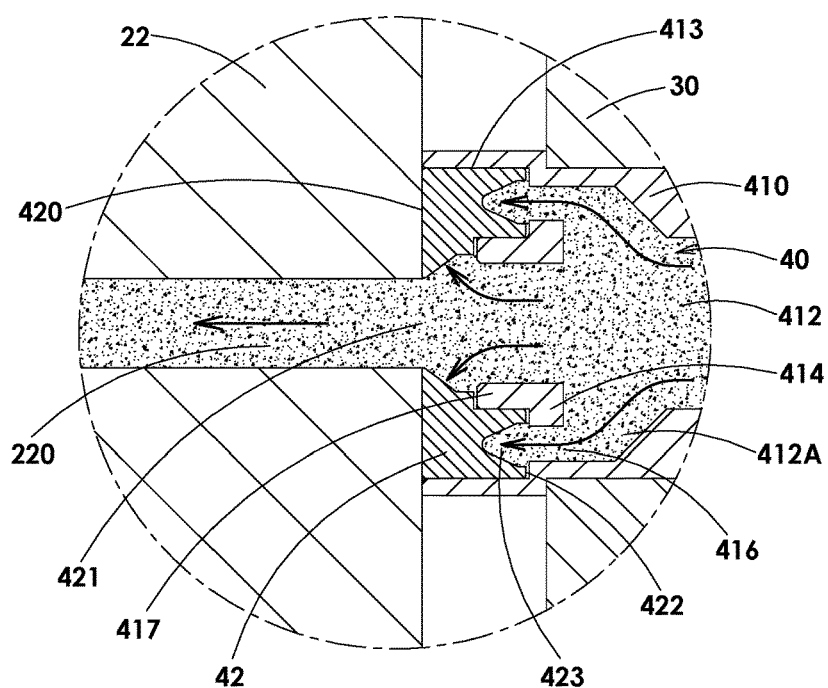
FIG. 11 is a schematic view of the water guide unit of the present invention, showing that a high-pressure cutting fluid is guided.

As shown in FIG. 7, FIG. 8, FIG. 9 and FIG. 10, the present invention discloses a high-pressure cutting fluid guide apparatus of a turret head of a machine tool. A turret head 20 includes a casing 21 and a water guide seat 30 on the casing 21. The water guide seat 30 has a cutting fluid passage 31 therein. An output end of the cutting fluid passage 31 has a mounting hole 32 which is disposed concentrically relative to the transposition locus trajectory of a plurality of water inlets 220 of a cutting disc 22 of the turret head 20. The mounting hole 32 is provided with a water guide unit 40. The water guide unit 40 includes a water guide cylinder 41 and a sealing ring 42. The water guide cylinder 41 has a cylinder body 410 mounted in the mounting hole 32 and a drain head portion 411 extending out of the mounting hole 32. The cylinder body 410 has a through hole 412 therein. The through hole 412 is in communication with the cutting liquid passage 31. The drain head portion 411 has an annular trough 413 therein and a partition 414 between the annular trough 413 and the through hole 412. The partition 414 has a main perforation 415 at a central portion thereof and at least one secondary perforation 416 around the main perforation 415. The annular trough 413 and the through hole 412 are communicated with each other through the main perforation 415 and the secondary perforation 416. The sealing ring 42 is a resilient wear-resistant plastic ring corresponding in shape to the annular trough 413, and can be axially moved to be mounted in the annular trough 413. An outer end of the sealing ring 42 has a sealing surface 420. The center of the sealing ring 42 has a water outlet 421 corresponding in size to the main perforation 415 and the water inlet 220. The outer circumference of the water outlet 421 is formed with a press surface portion 422 corresponding to the secondary perforation 416. As shown in FIG. 9 and FIG. 10, when the high-pressure cutting fluid is input to the cutting liquid passage 31, the high-pressure cutting fluid flows along the through hole 412 of the water guide cylinder 41, and passes through the main perforation 415 of the partition 414, and then flows to the water outlet 421 of the sealing ring 42 to be guided into the water inlet 220 of the cutting disc 22. As shown in FIG. 11, the secondary perforation 416 of the partition 414 guides the high-pressure cutting fluid in the through hole 412 to the press surface portion 422 of the sealing ring 42. The sealing ring 42 is located in the annular trough 413, and the press surface portion 422 is pushed by the high-pressure cutting fluid pressure to generate the energy of the axial displacement. The higher the high-pressure cutting fluid pressure, the higher the pushing force. The sealing surface 420 of the sealing ring 42 can be tightly adhered to the circumferential surface of the water inlet 220 of the cutting disc 22 so as to seal and block the high-pressure cutting fluid from leaking via the water inlet 220 of the cutting disc 22. The friction caused by the sealing surface 420 of the sealing ring 42 to get contact with the rotary cutting disc 22 can be automatically compensated by the wear caused by the axial displacement of the sealing ring 42 in the annular trough 413 so as to prolong the service life of the sealing ring 42.

According to the aforesaid embodiment, as shown in FIGS. 9 and 10, the through hole 412 of the water guide cylinder 41 is in a trumpet shape and has an enlarged portion 412A extending to the secondary perforation 416 of the partition 414. As shown in FIG. 11, the press surface portion 422 of the sealing ring 42 can obtain the liquid pressure or thrust of the high-pressure cutting fluid directly from the enlarged portion 412A of the through hole 412 by means of the secondary perforation 416 of the partition 414, so that the sealing ring 42 generates a thrust energy of the outward axial displacement in the annular trough 413.

According to the aforesaid embodiment, as shown in FIG. 10, the press surface portion 422 of the sealing ring 42 is formed with a press groove 423 having a V-shaped cross-section. As shown in FIG. 11, through the press groove 422, the area of thrust surface in increased. In addition to improving the sealing effect that the sealing surface 420 of the sealing ring 42 is tightly attached to the circumferential surface of the water inlet 220 of the cutting disc 22, the shape of the press groove 423 will be deformed and enlarged with the incoming liquid pressure. The greater the deformation, the greater the energy. The sealing ring 42 provides a better sealing effect for the annular trough 413 during the passing of the high-pressure cutting fluid. As shown in FIG. 10, the press groove 423 is provided with a spring member 424 for restraining indentation of the press groove 423, so that the push groove 423 can be maintained or held in the V shape for a long time.

According to the aforesaid embodiment, as shown in FIGS. 8, 9 and 10, one end of the main perforation 415 of the partition 414 is formed with an engaging portion 417 corresponding to an annular inner hole of the sealing ring 42. The annular inner hole of the sealing ring 412 is engaged with the engaging portion 417. As shown in FIG. 11, the engaging portion 417 provides a support and displacement guide function for the annular inner hole of the sealing ring 42. When the press surface portion 422 of the sealing ring 42 bears the fluid pressure or the thrust, the press energy can be guided to the sealing surface portion 420 in a stable manner.

According to the aforesaid embodiment, as shown in FIGS. 9 and 10, the water outlet 421 of the sealing ring 42 is a tapered water outlet having a reduced diameter from the inside to the outside. As shown in FIG. 11, when the high-pressure cutting fluid is drained from the water outlet 421 to the water inlet 220 of the cutting disc 22, the tapered wall of the water outlet 421 is able to bear the thrust of the high-pressure cutting fluid so that the sealing surface 420 of the sealing ring 42 is to seal the water inlet 220 of the cutting disc 22 tightly, enhancing the sealing effect.

According to the aforesaid embodiment, as shown in FIGS. 8 and 9, the surface of the cylinder body 40 of the water guide cylinder 41 is formed with at least an annular groove 418. The annular groove 418 is provided with an O-shaped ring 43 and an annular spring clip 44. When the cylinder body 410 is mounted in the mounting hole 32, the O-shaped ring 43 is in contact with the wall of the mounting hole 32 to prevent leakage, and the expansion in the radial direction of the spring clip 44 acts on the wall of the mounting hole 32 to provide a positioning effect, so that the water guide cylinder 41 can be easily assembled or disassembled in the mounting hole 32.

Figure 12:
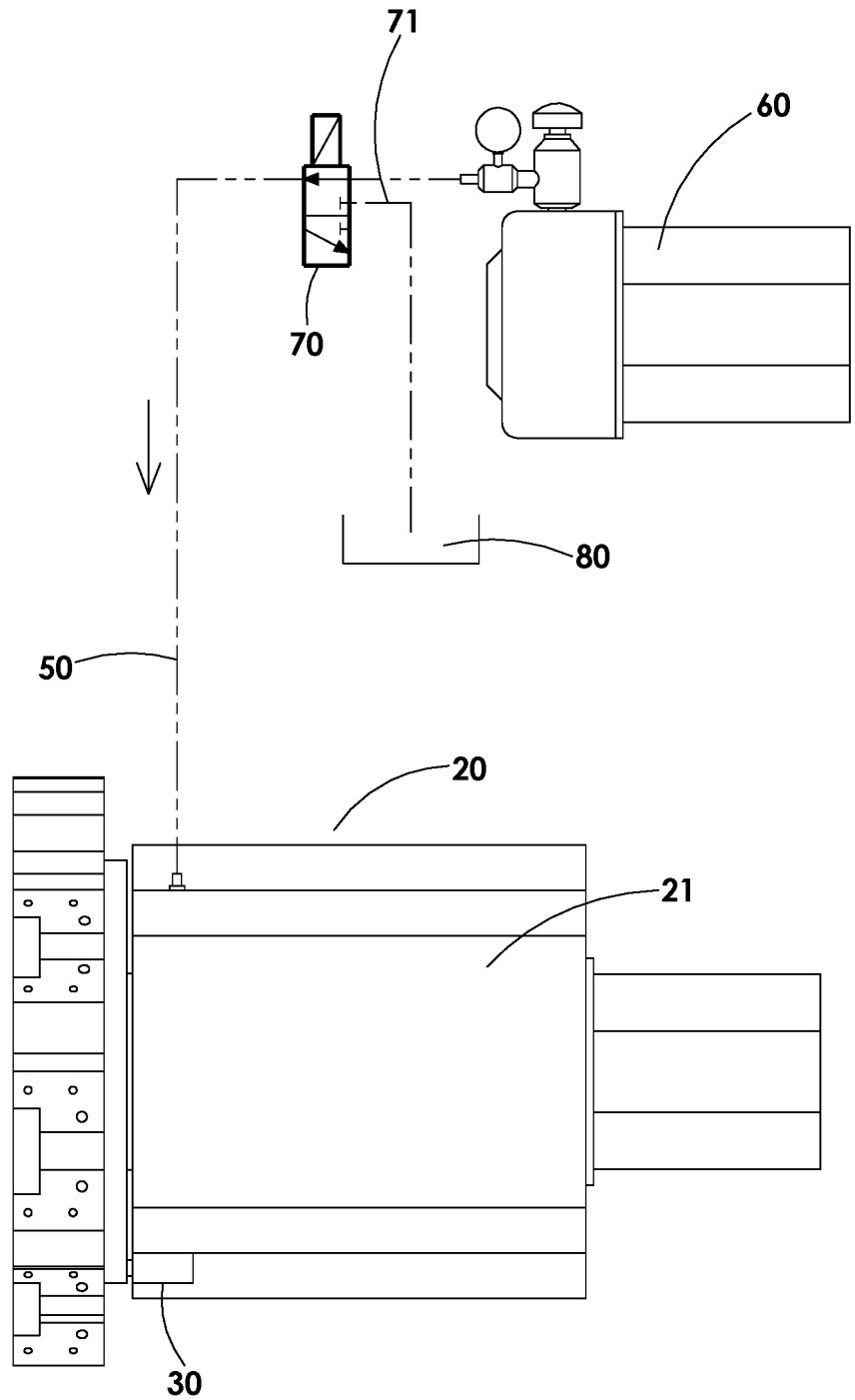
FIG. 12 is a structural schematic view of the present invention connected with a pump.
Figure 13:
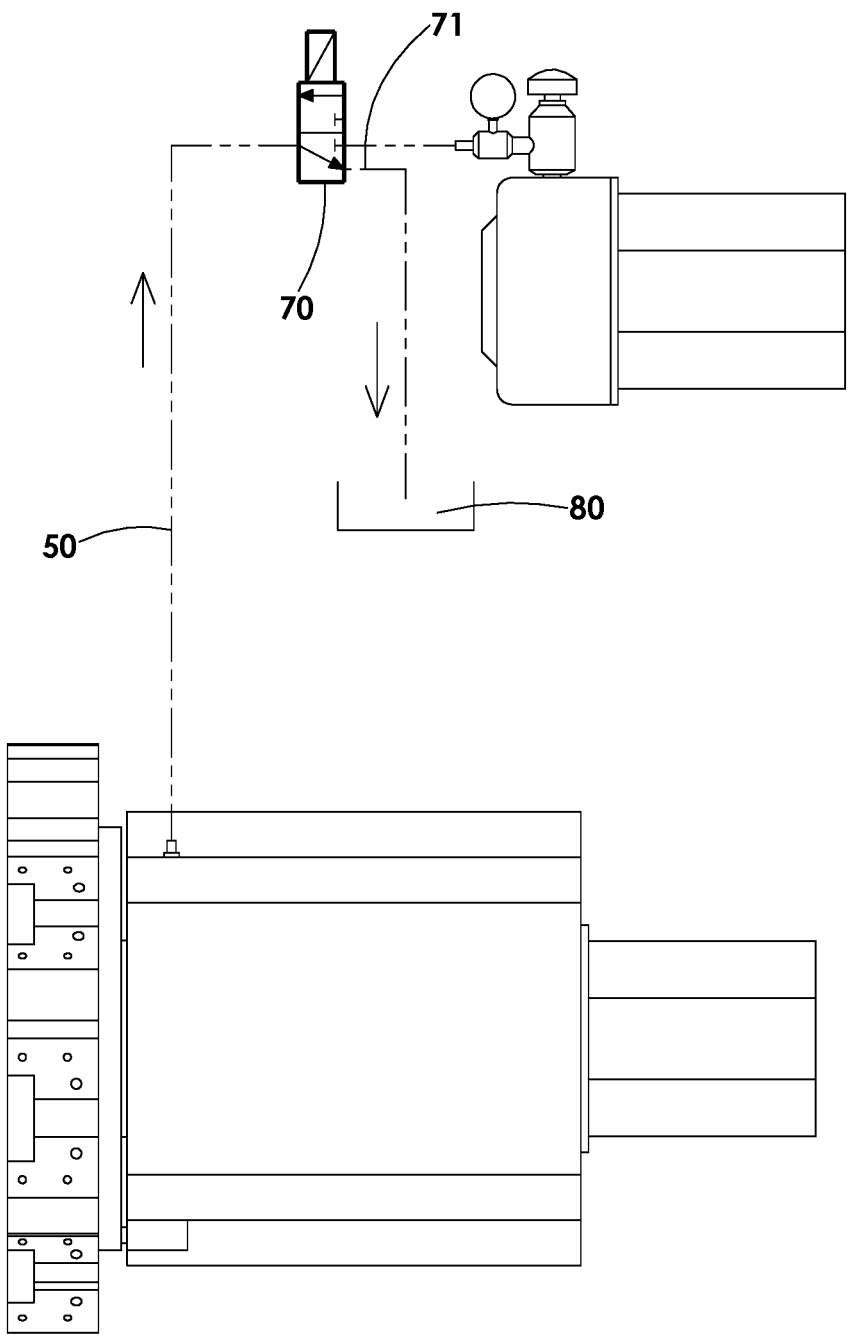
FIG. 13 is a schematic view of the present invention, showing that the water guide unit and the pump stop inputting the high-pressure cutting fluid.
Figure 14:
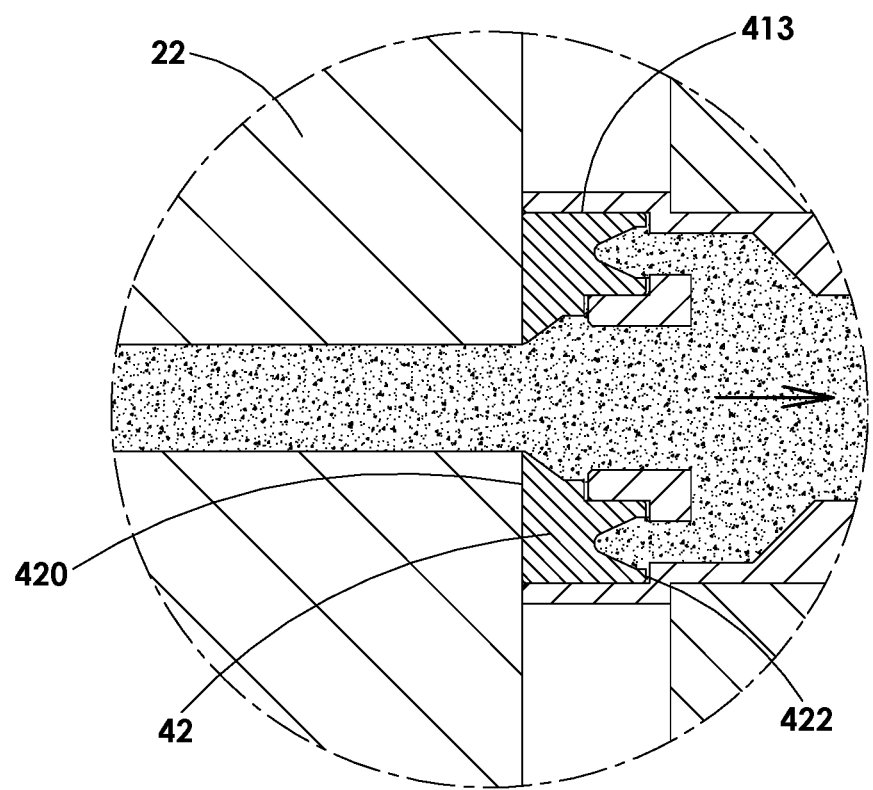
FIG. 14 is a schematic view of the present invention, showing that the press surface portion of the sealing ring of the water guide unit is released.

According to the aforesaid embodiment, as shown in FIGS. 9 and 12, the cutting fluid passage 31 of the water guide seat 30 on the casing 21 of the turret head 20 is connected with a pump 60 through a water supply pipe 50. The water supply pipe 50 is provided with a water control valve 70. One end of the water control valve 70 is a pressure-relief drain end 71 communicating with a water source 80. Through the water control valve 70, the water supply pipe 50 communicates with the pump 60. The cutting fluid passage 31 is inputted with the high-pressure cutting fluid from the pump 60. As shown in FIG. 9 and FIG. 13, the switching of the water control valve 70 enables the high-pressure cutting fluid in the cutting fluid passage 31 and the water supply pipe to be drained to the water source 80 via the pressure-relief drain end 71. As shown in FIG. 14, the high-pressure thrust release action of the press surface portion 422 of the sealing ring 42 allows the sealing ring 42 to be moved inward and axially in the annular trough 413, such that the contact between the sealing surface 420 of the sealing ring 42 and the cutting disc 22 can reduce or avoid wear and tear during the rotation of the cutting disc 22 for changing a cutter.

Figure 15:
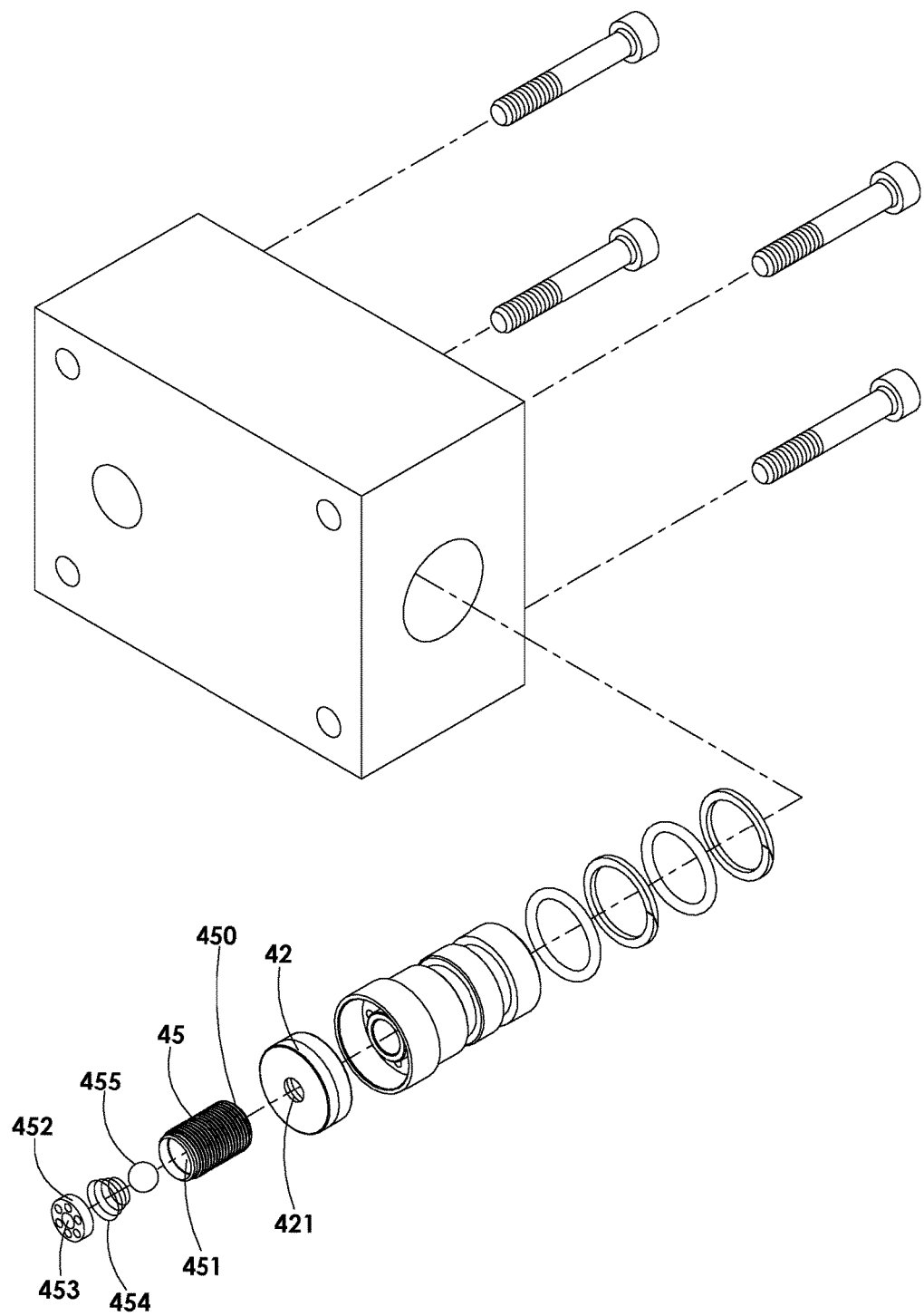
FIG. 15 is an exploded view of the water guide unit of the present invention in cooperation with an inlet mating member.
Figure 16:
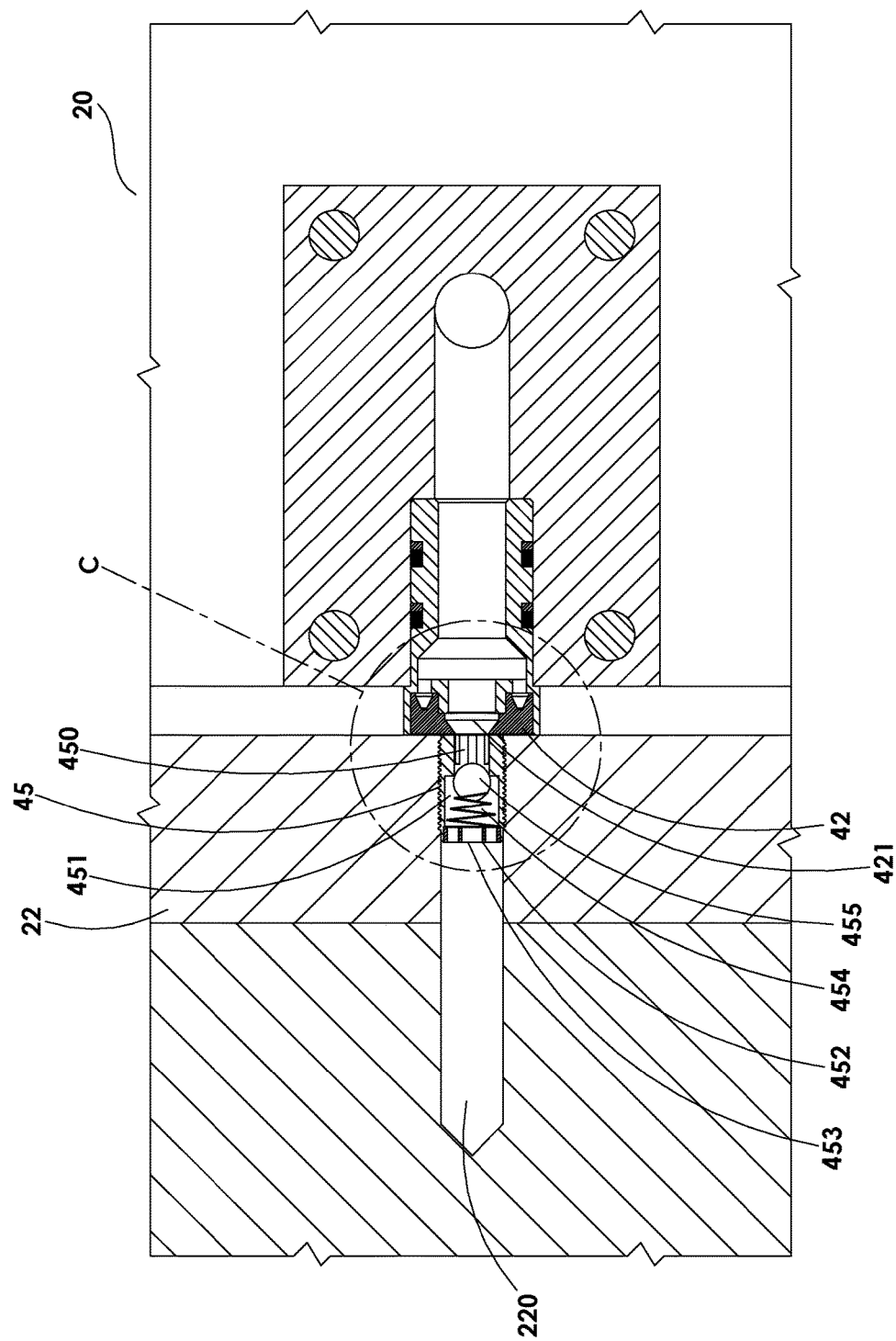
FIG. 16 is a sectional view of the water guide unit of the present invention in cooperation with the inlet mating member.
Figure 17:
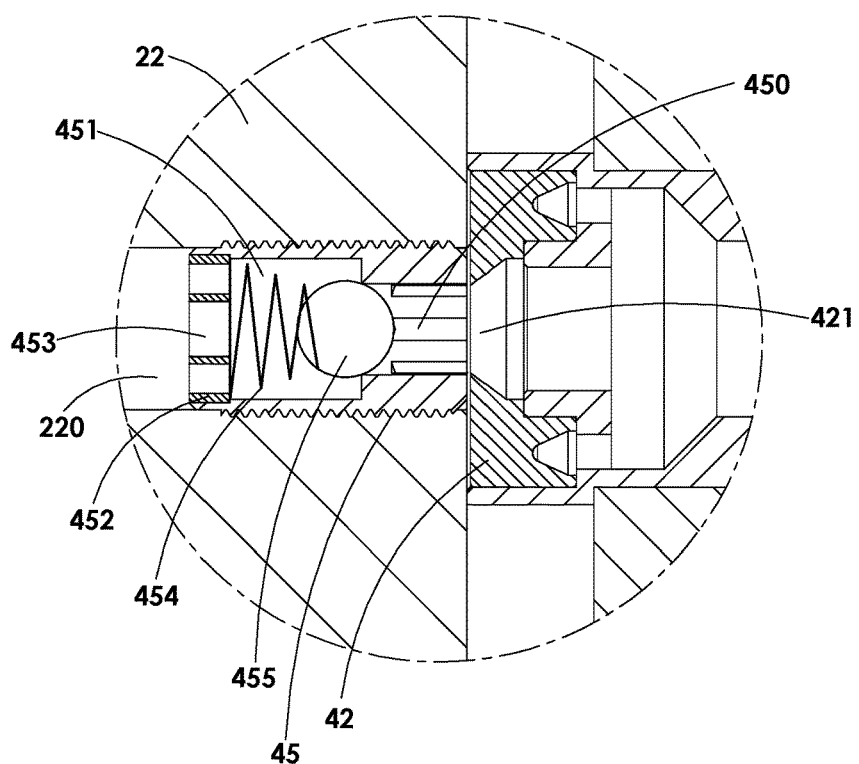
FIG. 17 is an enlarged view of the circle C of FIG. 16.
Figure 18:
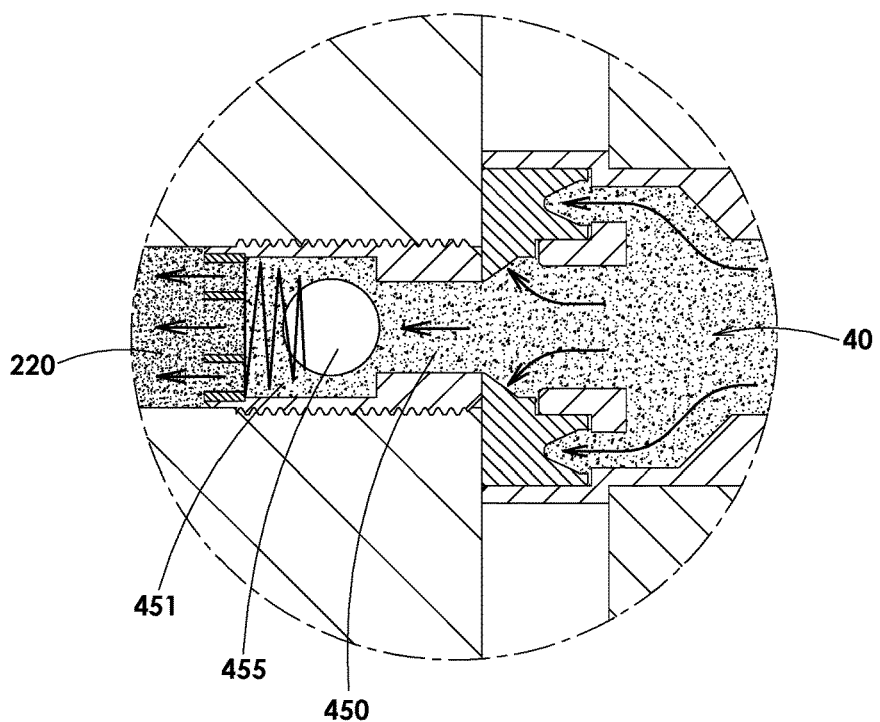
FIG. 18 is a schematic view of the water guide unit of the present invention in cooperation with the inlet mating member, showing the water to be guided.
Figure 19:
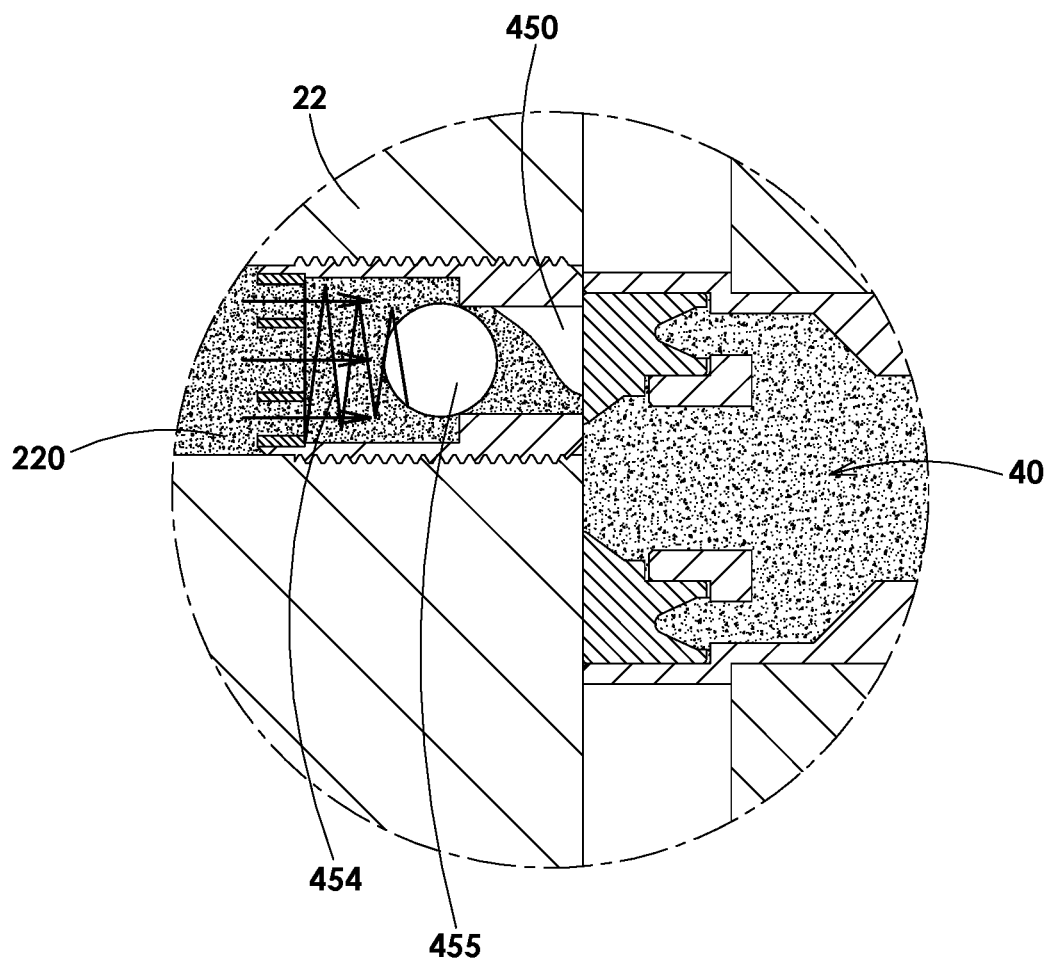
FIG. 19 is a schematic view of the present invention, showing the inlet mating member is used to stop water supply.

According to the aforesaid embodiment, as shown in FIGS. 15, 16 and 17, the water inlet 220 of the cutting disc 22 of the turret head 20 is provided with an inlet mating member 45. An outer end of the inlet mating member 45 has a mating through hole 450 corresponding in size to the water outlet 421 of the sealing ring 42 and communicating with the water inlet 220. The existing cutting disc 22 on the market has a plurality of water inlets 220 of different diameters. Through the inlet mating member 45, the cutting disc 22 can be mated with the sealing ring 42 well to achieve the desired effect. A valve hole 451 is formed inside the mating through hole 450 of the inlet mating member 45. An outer end of the valve hole 451 is provided with a support plate 452. The support plate 452 has a plurality of apertures 453 to communicate with the valve hole 451 and the water inlet 220. A compression spring 454 is supported by the support plate 452 for pushing a steel ball 455 to close an inner end of the mating through hole 450. As shown in FIG. 18, when the liquid pressure of the high-pressure cutting fluid inside the water guide unit 40 is greater than the liquid pressure of the high-pressure cutting fluid at the water inlet 220, the steel ball 455 is pushed to open the mating through hole 450 so that the high-pressure cutting fluid passes through the valve hole 451 to enter the water inlet 220. On the contrary, as shown in FIG. 19, when the input of the high-pressure cutting fluid is stopped (for example, when the cutting disk 22 is rotated), the steel ball 455 is returned to close the mating through hole 450 by the rebound force of the compression spring 454 to prevent the high-pressure cutting fluid in the water inlet 220 from flowing back to the water guide unit 40. When the cutting disc 22 is rotated for changing a cutter, the high-pressure cutting fluid won't be ejected from the water inlet 220.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A high-pressure cutting fluid guide apparatus of a turret head of a machine tool, a casing of the turret head having a cutting fluid passage therein, an output end of the cutting fluid passage having a mounting hole relative to a transposition locus trajectory of a plurality of water inlets of a cutting disc of the turret head, the mounting hole being provided with a water guide unit; the water guide unit including a water guide cylinder and a sealing ring; the water guide cylinder having a cylinder body mounted in the mounting hole and a drain head portion extending out of the mounting hole, the cylinder body having a through hole therein, the through hole being in communication with the cutting liquid passage, the drain head portion having an annular trough therein and a partition between the annular trough and the through hole, the partition having a main perforation at a central portion thereof and at least one secondary perforation around the main perforation, the annular trough and the through hole being communicated with each other through the main perforation and the secondary perforation; the sealing ring being a resilient wear-resistant plastic ring corresponding in shape to the annular trough and movable axially to be mounted in the annular trough, an outer end of the sealing ring having a sealing surface, a center of the sealing ring having a water outlet corresponding in size to the main perforation, an outer circumference of the water outlet being formed with a press surface portion corresponding to the secondary perforation.

2. The high-pressure cutting fluid guide apparatus of a turret head of a machine tool as claimed in claim 1, wherein the through hole of the water guide cylinder is in a trumpet shape and has an enlarged portion extending to the secondary perforation of the partition.

3. The high-pressure cutting fluid guide apparatus of a turret head of a machine tool as claimed in claim 1, wherein the press surface portion of the sealing ring is formed with a press groove having a V-shaped cross-section.

4. The high-pressure cutting fluid guide apparatus of a turret head of a machine tool as claimed in claim 3, wherein the press groove is provided with a spring member for restraining indentation of the press groove.

5. The high-pressure cutting fluid guide apparatus of a turret head of a machine tool as claimed in claim 1, wherein one end of the main perforation of the partition is formed with an engaging portion corresponding to an annular inner hole of the sealing ring, and the annular inner hole of the sealing ring is engaged with the engaging portion.

6. The high-pressure cutting fluid guide apparatus of a turret head of a machine tool as claimed in claim 1, wherein the water outlet of the sealing ring is a tapered water outlet having a reduced diameter from the inside to the outside.

7. The high-pressure cutting fluid guide apparatus of a turret head of a machine tool as claimed in claim 1, wherein a surface of the cylinder body of the water guide cylinder is formed with at least an annular groove, and the annular groove is provided with an 0-shaped ring and an annular spring clip.

8. The high-pressure cutting fluid guide apparatus of a turret head of a machine tool as claimed in claim 1, wherein the cutting fluid passage of the casing of the turret head is connected with a pump through a water supply pipe, the water supply pipe is provided with a water control valve, and one end of the water control valve is a pressure-relief drain end communicating with a water source.

9. The high-pressure cutting fluid guide apparatus of a turret head of a machine tool as claimed in claim 1, wherein each water inlet of the cutting disc of the turret head is provided with an inlet mating member, an outer end of the inlet mating member has a mating through hole corresponding in size to the water outlet of the sealing ring and communicating with the water inlet.

10. The high-pressure cutting fluid guide apparatus of a turret head of a machine tool as claimed in claim 9, wherein a valve hole is formed inside the mating through hole of the inlet mating member, an outer end of the valve hole is provided with a support plate, the support plate has a plurality of apertures to communicate with the valve hole and the water inlet, and a compression spring is supported by the support plate for pushing a steel ball to close an inner end of the mating through hole.

\* \* \* \* \*